(12) United States Patent
Roberts et al.

(10) Patent No.: US 9,109,637 B2
(45) Date of Patent: Aug. 18, 2015

(54) ADAPTER RINGS FOR ATTACHING AUTOMOTIVE CLUTCH ASSEMBLIES TO DIFFERENT TYPES OF FLYWHEELS

(75) Inventors: Paul Ghyrane Roberts, Orange, CA (US); Paul William Lee, Anaheim Hills, CA (US)

(73) Assignee: McLeod Racing, LLC, Placentia, CA (US)

( * ) Notice: Subject to any disclaimer, the term of this patent is extended or adjusted under 35 U.S.C. 154(b) by 0 days.

(21) Appl. No.: 13/325,818

(22) Filed: Dec. 14, 2011

(65) Prior Publication Data

US 2012/0181134 A1 Jul. 19, 2012

Related U.S. Application Data

(60) Provisional application No. 61/422,892, filed on Dec. 14, 2010.

(51) Int. Cl.
| | |
|---|---|
| *F16D 13/58* | (2006.01) |
| *F16D 13/70* | (2006.01) |
| *F16D 13/38* | (2006.01) |
| *F16D 65/02* | (2006.01) |

(52) U.S. Cl.
CPC .............. *F16D 13/385* (2013.01); *F16D 13/58* (2013.01); *F16D 13/70* (2013.01); *F16D 2065/134* (2013.01); *Y10T 29/49826* (2015.01)

(58) Field of Classification Search
USPC ..................................... 192/70.11, 110 S, 115
See application file for complete search history.

(56) References Cited

U.S. PATENT DOCUMENTS

| | | | |
|---|---|---|---|
| 3,175,664 A | | 3/1965 | Ramsel |
| 3,360,089 A | | 12/1967 | Cockerill et al. |
| 3,361,482 A | * | 1/1968 | Stevens .................... 301/35.629 |
| 3,584,720 A | | 6/1971 | Bark et al. |
| 3,797,622 A | | 3/1974 | Worner et al. |
| 4,109,368 A | * | 8/1978 | Hubbard et al. ................. 29/446 |
| 4,180,024 A | * | 12/1979 | Hernandez ................. 123/41.46 |
| 4,466,524 A | | 8/1984 | Lane |
| 4,540,079 A | | 9/1985 | Link |
| 4,558,771 A | * | 12/1985 | Despres ..................... 192/70.18 |
| 4,600,092 A | | 7/1986 | Billet et al. |
| 4,692,053 A | * | 9/1987 | Sampedro ....................... 403/24 |
| 4,715,484 A | | 12/1987 | Flotow |
| 4,811,826 A | | 3/1989 | Kittel et al. |
| 4,815,189 A | * | 3/1989 | Ijames et al. ................. 29/401.1 |

(Continued)

OTHER PUBLICATIONS

Haldex service manual LL30002 Revised Jul. 2003 and copyrighted 2007 pp. 11 and 19-20.*

*Primary Examiner* — Ramya Burgess
*Assistant Examiner* — Mark Manley
(74) *Attorney, Agent, or Firm* — Alan G. Towner, Esq.; Pietragallo Gordon Alfano Bosick & Raspanti, LLP

(57) ABSTRACT

Adapter rings for attaching automotive clutch assemblies to different types of flywheels are disclosed. A single adapter ring may be installed on different types of stock or aftermarket flywheels. In one embodiment, a multiple-disc clutch assembly may be mounted onto the adapter ring. The multiple-disc clutch unit may fit inside a stock bellhousing to enable the user to utilize the stock clutch release mechanism and simultaneously increase the holding power capability while maintaining light pedal effort. Aftermarket replacement OEM clutch units including the adapter ring may be used with higher horsepower engines in automotive vehicles with manual transmissions.

31 Claims, 4 Drawing Sheets

(56) References Cited

U.S. PATENT DOCUMENTS

| | | | |
|---|---|---|---|
| 4,899,860 A | * | 2/1990 | Diederich .................... 192/58.4 |
| 4,977,991 A | | 12/1990 | Mahoney |
| 5,029,686 A | | 7/1991 | Yesnik |
| 5,054,597 A | | 10/1991 | Tarlton, Sr. |
| 5,203,441 A | * | 4/1993 | Monette ........................ 192/112 |
| 5,524,508 A | * | 6/1996 | Peters .......................... 74/606 R |
| 5,634,542 A | | 6/1997 | Grosse-Erdmann et al. |
| 5,651,441 A | | 7/1997 | Viola et al. |
| 5,682,970 A | | 11/1997 | Sevennec |
| 5,857,548 A | | 1/1999 | Uenohara et al. |
| 6,145,643 A | | 11/2000 | Pinschmidt et al. |

* cited by examiner

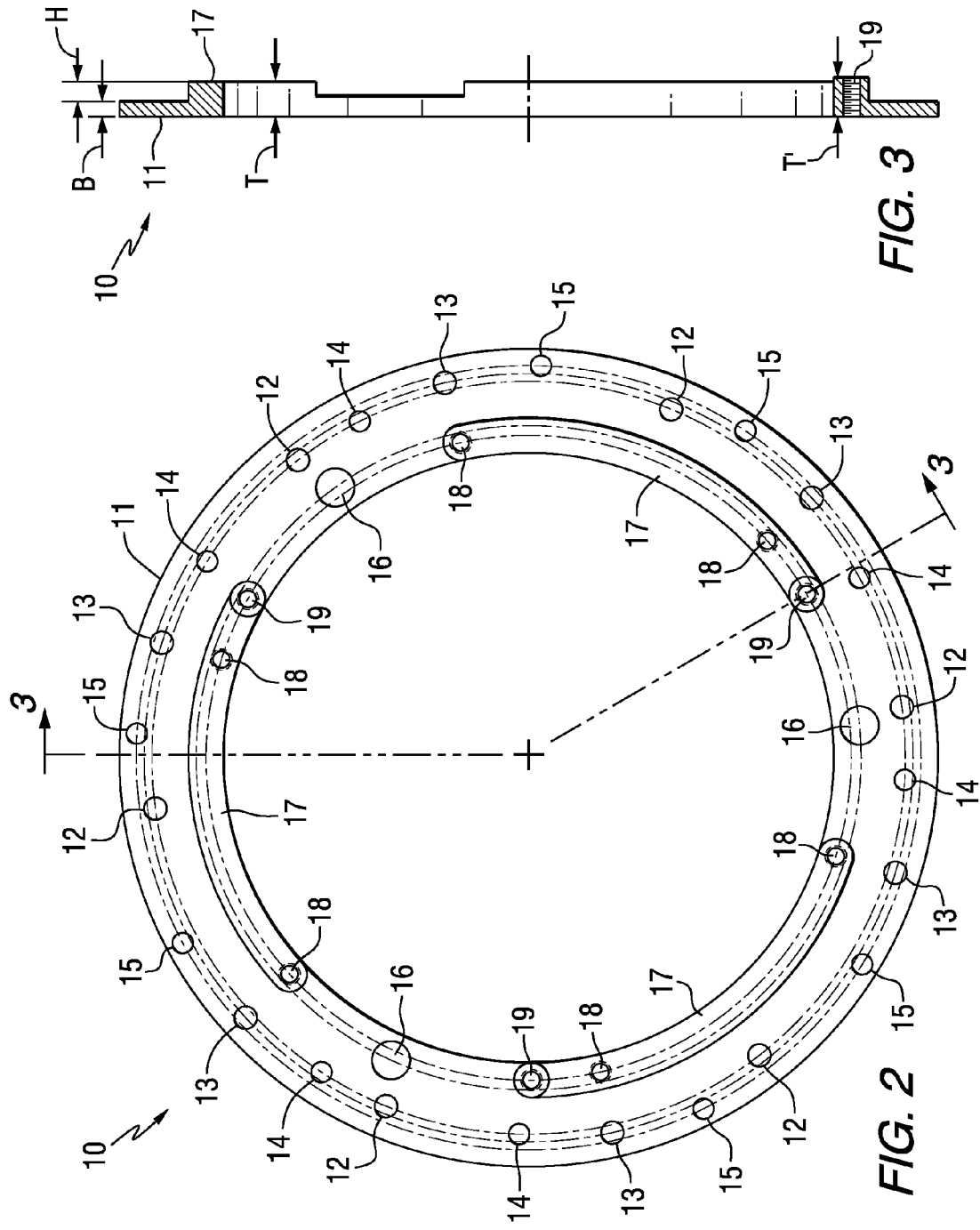

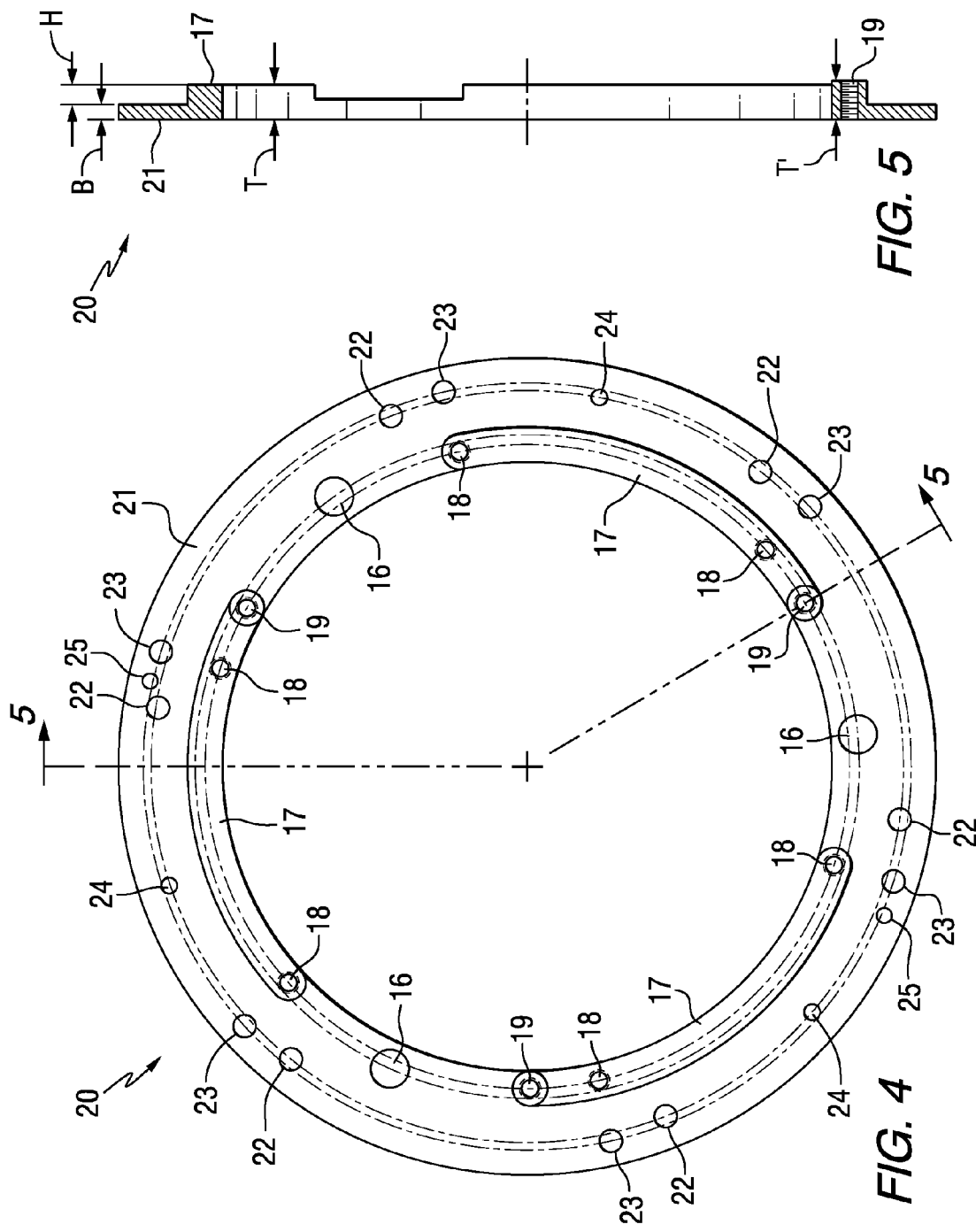

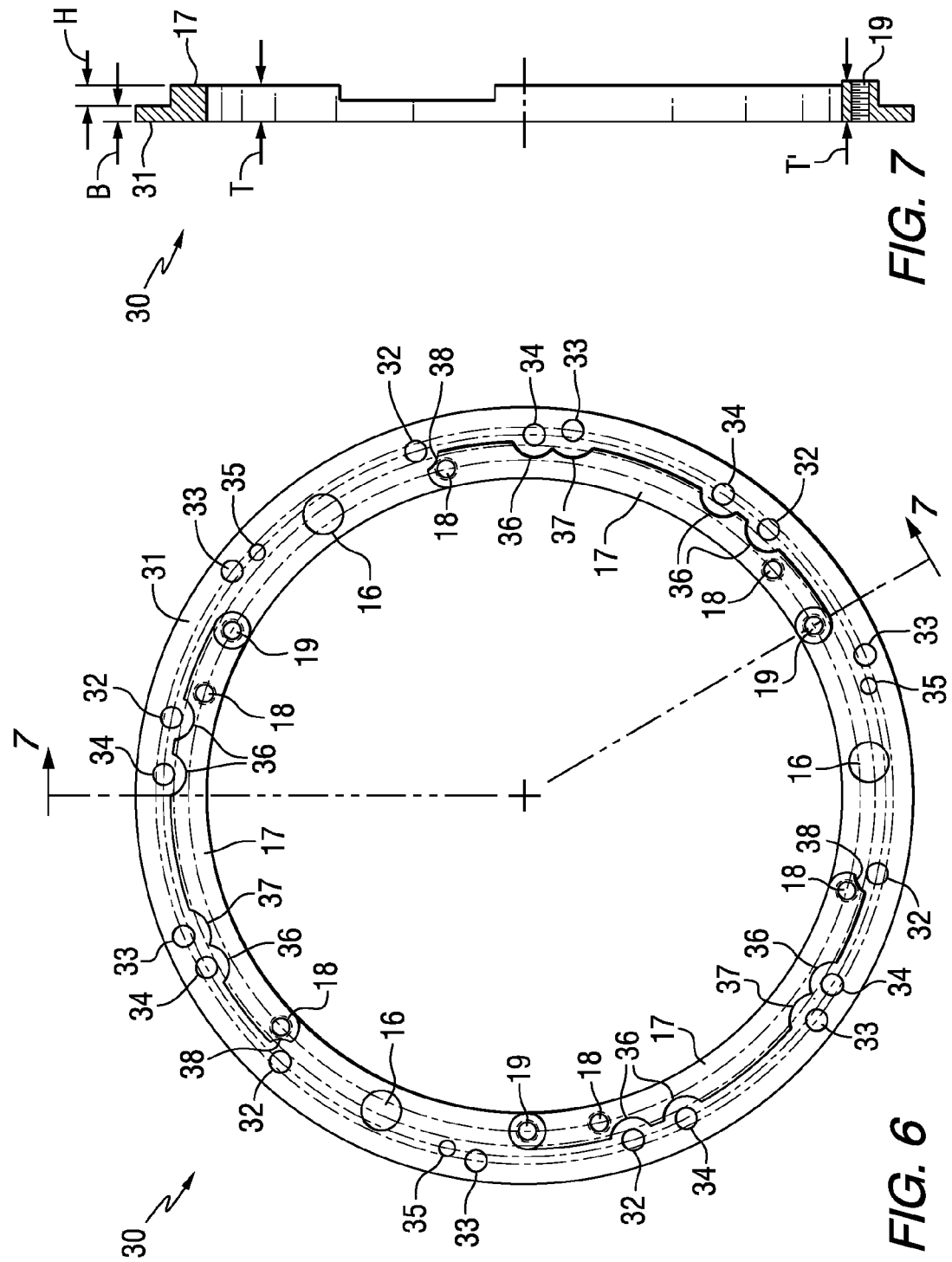

ADAPTER RINGS FOR ATTACHING AUTOMOTIVE CLUTCH ASSEMBLIES TO DIFFERENT TYPES OF FLYWHEELS

CROSS-REFERENCE TO RELATED APPLICATION

This application claims the benefit of U.S. Provisional Patent Application Ser. No. 61/422,892 filed Dec. 14, 2010, which is incorporated herein by reference.

FIELD OF THE INVENTION

The present invention relates to adapter rings for attaching automotive clutch assemblies to different types of flywheels. A single adapter ring may be used to mount aftermarket multiple-disc clutch assemblies to various types of automotive flywheels.

BACKGROUND INFORMATION

Automotive clutch assemblies are typically mounted on a flywheel driven by the engine of the automobile. In certain types of clutch assemblies, multiple clutch discs are used in order to increase the frictional surface area when the clutch is engaged. Examples of multiple-disc clutch assemblies are disclosed in U.S. Pat. Nos. 3,360,089; 3,797,622; 4,466,524; 4,540,079; 4,715,484; 4,815,189; 5,054,597; 7,977,991, which are incorporated herein by reference.

Aftermarket multiple-disc clutch assemblies are often installed in automobiles to increase performance. Original equipment manufacturer (OEM) or stock clutch units may not provide optimum performance and often require replacement because they cannot support the horsepower of the engine, and can fail. Higher horsepower engines and drivelines require a higher performance or heavy duty clutch unit to hold the horsepower for proper application to the driveline.

Different types of automobiles have different types of flywheels. The mounting arrangement for aftermarket clutch assemblies is different based upon the particular type of automobile and its corresponding flywheel design. In the past, providing a higher performance OEM replacement clutch unit required the user to additionally purchase a matching flywheel. Most aftermarket high performance clutch assemblies are sold with a new or dedicated flywheel, which adds to the cost of upgrading clutch and auto performance. Furthermore, most aftermarket OEM replacement clutches have a harder-than-stock pedal effort, which makes the vehicle more difficult to drive, and the clutch may not release properly with OEM hydraulic release systems.

The adapter rings of the present invention solve the problems noted above and are able to be used on street or strip driven automotive vehicles.

SUMMARY OF THE INVENTION

The present invention provides adapter rings for attaching automotive clutch assemblies to different types of flywheels. A single adapter ring may be installed on different types of stock or aftermarket flywheels. In one embodiment, a multiple-disc clutch assembly may be mounted onto the adapter ring. The multiple-disc clutch unit may fit inside a stock bellhousing to enable the user to utilize the stock clutch release mechanism and simultaneously increase the holding power capability while maintaining light pedal effort. Aftermarket replacement OEM clutch units with adapter rings of the present invention may be used with higher horsepower engines in manual transmission automotive vehicles for street and strip use.

An aspect of the present invention is to provide an adapter ring for attaching automotive clutch assemblies to flywheels comprising an annular base having a flywheel-engaging surface, at least one raised portion extending axially from the base structured for attachment to the clutch assembly, a first set of flywheel mounting holes extending axially through the base arranged for mounting the adapter ring to a first type of flywheel, and a second set of flywheel mounting holes at different locations from the first set of flywheel mounting holes extending axially through the base arranged for mounting the adapter ring to a second type of flywheel.

Another aspect of the present invention is to provide an assembly comprising an automotive clutch assembly, an automotive flywheel, and an adapter ring connecting the automotive clutch assembly to the automotive flywheel, wherein the adapter ring comprises a first set of flywheel mounting holes that are used to mount the adapter ring on the automotive flywheel, and a second set of flywheel mounting holes that are not used to mount the adapter ring on the automotive flywheel.

A further aspect of the present invention is to provide a method of installing an automotive clutch assembly on an automotive flywheel comprising selecting an adapter ring from a plurality of adapter rings having different flywheel mounting hole arrangements, attaching the automotive clutch assembly to the adapter ring, and attaching the adapter ring to the automotive flywheel.

These and other aspects of the present invention will be more apparent from the following description.

BRIEF DESCRIPTION OF THE DRAWINGS

FIG. 2 is a plan view of an adapter ring in accordance with an embodiment of the present invention.

FIG. 3 is a side sectional view taken through section 3-3 of FIG. 2.

FIG. 4 is a plan view of an adapter ring in accordance with another embodiment of the present invention.

FIG. 5 is a side sectional view taken through section 5-5 of FIG. 4.

FIG. 6 is a plan view of an adapter ring in accordance with a further embodiment of the present invention.

FIG. 7 is a side sectional view taken through section 7-7 of FIG. 6.

DETAILED DESCRIPTION

Figure 1:
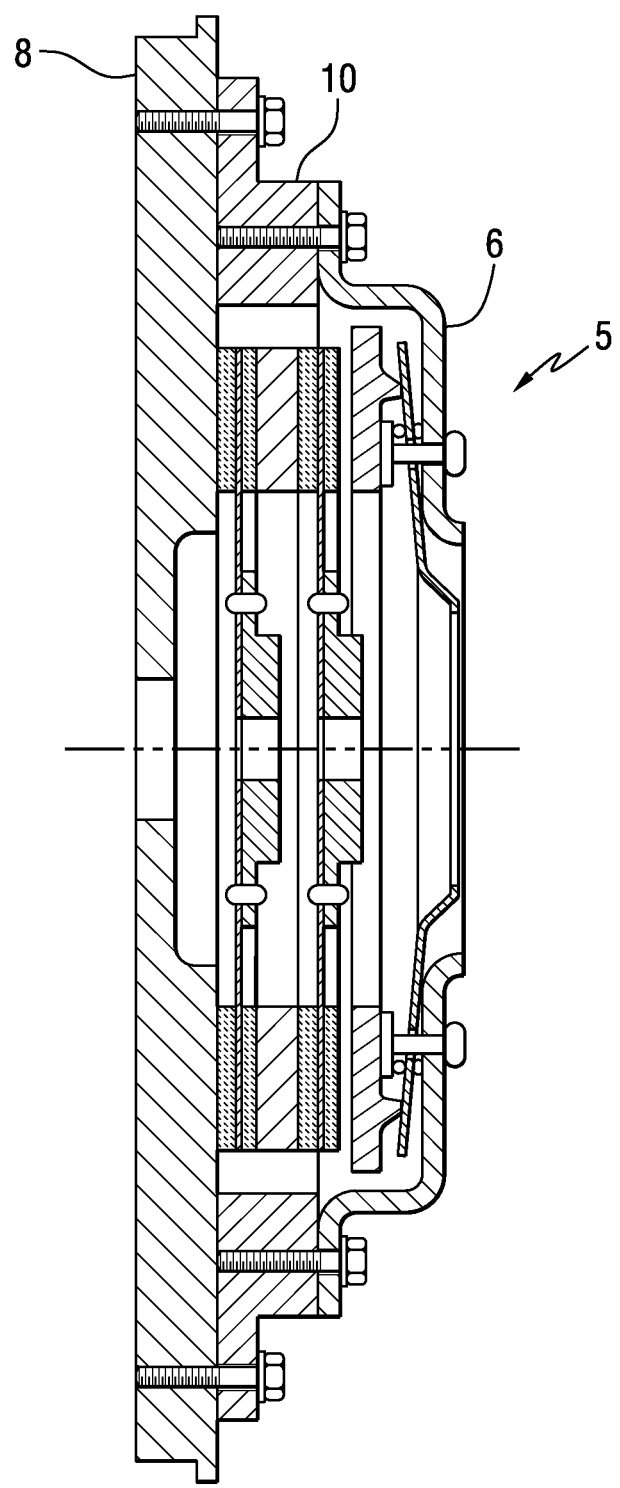
FIG. 1 is a partially schematic side sectional view illustrating an automotive flywheel and clutch assembly including an adapter ring in accordance with an embodiment of the present invention.

FIG. 1 is a partially schematic side sectional view illustrating a clutch assembly 5 including a clutch cover 6. The clutch assembly 5 is mounted on a flywheel 8 driven by an automobile engine (not shown). An adapter ring 10 of the present invention is mounted on the flywheel 8 by bolts or any other conventional type of mechanical fastener. The clutch assembly 5 may be of any known design, including multiple-disc clutch assemblies and the like. Examples of suitable multiple-disc clutch assemblies 5 that may be used with adapter rings of the present invention include assemblies commercially available from McLeod Racing, LLC under the designations McLeod RST Street Twin and McLeod RXT Street Twin.

FIGS. 2 and 3 illustrate an adapter ring 10 in accordance with an embodiment of the present invention. The adapter ring 10 includes an annular base 11 having a substantially flat surface for contacting a flywheel, and several sets of flywheel mounting holes extending therethrough in an axial direction parallel with the central axis of the adapter ring 10.

As shown most clearly in FIG. 2, the adapter ring 10 includes a first set of six flywheel mounting holes 12 equally spaced around the circumference of the base 11, i.e., at intervals of 60°. In the embodiment shown, the diametrical distance between the centers of opposing holes is 12.375 inches. Each hole 12 of the first set may have a diameter of 0.395-0.397 inch. While various dimensions are disclosed herein for purposes of describing certain embodiments of the present invention, it is to be understood that many different modifications may be made to the configurations and dimensions described herein, and such modifications are intended to be within the scope of the present invention.

The adapter ring 10 includes a second set of six flywheel mounting holes 13 equally spaced around the circumference of the base 11 at different positions from the first set of flywheel mounting holes 12. In the embodiment shown, the diametrical distance between opposing holes 13 is 12.625 inches, and each hole 13 has a diameter of 0.395-0.397 inch.

A third set of flywheel mounting holes 14 comprises three pairs of holes, with each pair equally spaced around the circumference of the base 11, i.e., at intervals of 120°. In each pair of the third set of holes 14, the adjacent holes are located an arc distance of 32° away from each other, as measured around the circumference of the base 11. The third set of flywheel mounting holes 14 are located the same radial distance from the center of the adapter ring 10 as the first set of flywheel mounting holes 12. The diameter of each hole 14 of the third set is 0.315-0.316 inch.

A fourth set of flywheel mounting holes 15 comprises three pairs of holes spaced equal distances apart around the circumference of the base 11 at different locations from the first, second and third sets of holes 12, 13 and 14. Each pair of holes 15 in the fourth set are located a linear distance of 3.563 inches from each other. The holes 15 of the fourth set have diameters of 0.315-0.316 inch. The holes 15 are located a radial distance from the center of the adapter ring 10 such that a circle extending around the circumference of the adapter ring 10 passing through the center of each hole 15 has a diameter of 12.875 inches.

As shown most clearly in FIG. 2, three recesses 16 are spaced equal distances around the circumference of the base 11. When mounting conventional clutch assemblies, the recesses 16 provide receiving areas for the heads of rivets (not shown) that hold clutch floater straps to floater plates, and allow clearance when the pressure plates compress the clutch discs and floater assembly. The recesses 16 may thus be used to space the clutch pressure plate to the correct height to properly compress two discs and one floater plate to the flywheel, and to space the drive straps for the floater plate to the correct release height. Spacing the floater straps allows for correct release of the discs. A secondary benefit allows added strength to the entire adapter ring. A circle around the circumference of the base 11 passing through the center of each recess 16 has a diameter of 10.935 inches. Each recess 16 has a diameter of 0.625 inch, and is 0.15 inch deep.

As shown in FIGS. 2 and 3, the adapter ring 10 includes raised portions 17 that extend from the base 11 in an axial direction parallel with the central axis of the adapter ring 10. In the embodiment shown, the adapter ring has three raised portions 17. The height H of each raised portion 17, measured in the axial direction from the surface of the base 11, may be selected depending upon the amount of compression that is required to apply correct pressure to the clutch disc(s), floater plate(s), and flywheel. In the embodiment shown, the height H is 0.350 inch, and the thickness B of the base 11 is 0.220 inch. The overall thickness T of the adapter ring 10 is 0.570 inch (+0.002/−0.000). As shown in FIG. 3, a portion of the raised portion 17 has a slightly increased thickness T' of 0.590 inch. However, it is to be understood that such dimensions may be modified as desired.

The base 11 of the adapter ring 10 in the embodiment shown in FIGS. 2 and 3 has an inside diameter of 10.000 inches, and an outside diameter of 13.500 inches. The raised portions 17 have the same inside diameter as the base 11, and have an outside diameter of 11.125 inches. However, such dimensions may be modified as desired.

As shown in FIG. 2, six pressure plate mounting holes 18 are located at equally spaced distances around the circumference of the adapter ring 10, and extend axially through the raised portions 17 and base 11. The pressure plate mounting holes 18 are tapped for receiving threaded bolts (not shown), e.g., tapped for standard ⅜-16 bolts. A circle around the circumference of the adapter ring 10 passing through the center of each hole 18 has a diameter of 10.550 inches.

As further shown in FIG. 2, three floater strap mounting holes 19 located at equal distances around the circumference of the adapter ring 10 extend axially through the raised portions 17 and the base 11. The floater strap mounting holes 19 are tapped for receiving threaded bolts (not shown). The floater strap mounting holes 19 are located the same radial distance from the center of the adapter ring 10 as the pressure plate mounting holes 18. As shown in FIG. 2, the linear distance between each floater strap mounting hole 19 and the closest recess 16 is 2.355 inches.

In accordance with another embodiment of the present invention as illustrated in FIGS. 4 and 5, an adapter ring 20 is provided including a base 21 and raised portions 17 similar to those of the adapter ring 10 shown in FIGS. 2 and 3. However, the adapter ring 20 shown in FIGS. 4 and 5 includes different sizes and arrangements of flywheel mounting holes in comparison with the adapter ring 10 shown in FIGS. 2 and 3.

In the embodiment of FIGS. 4 and 5, the adapter ring 20 includes a first set of six flywheel mounting holes 22 equally spaced around the circumference of the base 21. In the embodiment shown, the diametrical distance between opposing flywheel mounting holes 22 is 12.375 inches, and the diameter of each hole 22 is 0.395-0.397 inch.

The adapter ring 20 includes a second set of six flywheel mounting holes 23 equally spaced around the circumference of the base 21, at different locations from the first set of holes 22. The holes 23 are located a diametric distance of 12.625 inches away from each other, and have diameters of 0.395-0.397 inch.

The adapter ring 20 also includes a first set of three dowel pin holes 24 extending axially through the base 21 that are spaced equally around the circumference of the base, i.e., at 120° intervals. The dowel pin holes 24 may be used to locate the adapter ring 20 on the flywheel and align the mounting holes of the adapter ring 20 to the flywheel. The dowel pin holes 24 are located the same radial distance from the center of the adapter ring 20 as the first set of holes 22. Each dowel pin hole 24 has a diameter of 0.252-0.253 inch.

The adapter ring 20 includes a second set of two dowel pin holes 25 extending axially through the base 21 that are equally spaced around the circumference of the base 21, i.e., at 180° intervals. The dowel pin holes 25 may be used to locate the adapter ring 20 on the flywheel and align the mounting holes of the adapter ring 20 to the flywheel. The diametric distance between the two dowel pin holes 25 is 12.772 inches, and the diameter of each dowel pin hole is 0.241-0.242 inch.

The adapter ring 20 as shown in FIGS. 4 and 5 includes the same arrangement of recesses 16, raised portions 17, pressure plate mounting holes 18, and floater strap mounting holes 19 as shown in the embodiment of FIGS. 2 and 3.

As can be seen by comparing the two different embodiments of the adapter rings 10 and 20, the rings have the same overall dimensions and common mounting hole arrangements for the clutch assemblies. However, the different patterns of flywheel mounting holes allow the adapter ring 10 of FIGS. 2 and 3 to be used on various types of flywheels, while the adapter ring 20 of FIGS. 4 and 5 may be used on various other types of flywheels.

In accordance with a further embodiment of the present invention as shown in FIGS. 6 and 7, an adapter ring 30 comprises a base 31 with similar recesses 16, raised portions 17, pressure plate mounting holes 18, and floater strap mounting holes 19 as shown in the embodiments of FIGS. 2-5. However, in the embodiment shown in FIGS. 6 and 7, the outer diameter of the base 31 is 12.250 inches, which is slightly smaller than the embodiments shown in FIGS. 2-5. The smaller outer diameter of the adapter ring 30 and its unique flywheel mounting hole arrangement permits the adapter ring 30 to be used with various types of flywheels different from the flywheels to which the adapter rings 10 and 20 may be mounted.

As shown in FIG. 6, the adapter ring 30 includes a first set of six flywheel mounting holes 32 equally spaced around the circumference of the base 31. The flywheel mounting holes 32 of the first set are located diametric distances of 11.375 inches from each other. Each hole 32 has a diameter of 0.315-0.316 inch.

A second set of six flywheel mounting holes 33 are equally spaced around the circumference of the base 31 at different locations from the first set of flywheel mounting holes 32. The second set of holes 33 are diametrically positioned from each other at a distance of 11.625 inches. The diameter of each hole 33 is 0.395-0.397 inch.

A third set of flywheel mounting holes 34 comprises three pairs of holes equally spaced around the circumference of the base 31, i.e., at 120° intervals. For each pair of the mounting holes 34, the linear distance between adjacent holes is 3.125 inches. The diameter of each hole 34 is 0.315-0.316 inch. The third set of flywheel mounting holes 34 are located the same radial distance from the center of the adapter ring 30 as the first set of flywheel mounting holes 32.

As shown in FIG. 6, a first set of three dowel pin holes 35 are equally spaced around the circumference of the adapter ring 30 at different locations from the first, second and third sets of holes 32, 33 and 34. The dowel pin holes 35 may be used to locate the adapter ring 30 on the flywheel and align the mounting holes of the adapter ring 30 to the flywheel. The dowel pin holes 35 are located the same radial distance from the center of the adapter ring 30 as the first set of flywheel mounting holes 32. The diameter of each dowel pin hole 35 is 0.252-0.253 inch.

As shown in FIG. 6, the adapter ring 30 also includes a first set of nine recessed spot faces 36 comprising semi-circular recesses in the raised portions 17 located as shown. The spot faces extend axially along the entire height H of the raised portions 17. The spot faces 36 are reliefs to allow a socket or wrench to contact a head of a bolt (not shown) passing through an adjacent flywheel mounting hole 32 or 34 so the bolt can be tightened to the proper torque during installation of the adapter ring 30. The clearances provided by the recessed spot faces 36 thus allow a socket or wrench to cleanly contact the bolt head. As shown in FIG. 6, the adapter ring 30 includes a second set of recessed spot faces 37 adjacent three of the flywheel mounting holes 33 having similar shapes and used for similar purposes as the recessed spot faces 36. In addition, a third set of spot faces 38 are provided at an end of each raised portion 17 adjacent to three of the flywheel mounting holes 32.

The clutch adapter rings of the present invention may be drilled for multiple clutch pattern applications to accommodate many flywheel designs and sizes. It has been found that three different clutch adapter rings, each having multiple flywheel mounting hole arrangements as described herein, enable one clutch assembly model to be used with virtually any type of currently available automotive flywheel. The raised area of the adapter ring allows proper clutch adjustment for proper operation of the pressure plate, clutch discs and clutch floater plate of clutch assemblies. An adapter ring of the present invention having mounting holes for various clutch flywheel patterns, and having a raised area, allows stock or aftermarket clutch assemblies to be bolted on existing stock or aftermarket automotive flywheels.

The adapter rings of the present invention can be used with most stock releasing mechanisms such as mechanical linkages, cable linkages and hydraulic linkages. They can be used with stock OEM or other aftermarket flywheels, and can be used inside existing stock or aftermarket bellhousings. In certain embodiments, the adapter rings allow the use of multi-disc clutch units that provide greater holding power than OEM and other aftermarket clutch units, and also still fit into OEM and other aftermarket bellhousings. The adapter rings also allow for the use of smaller clutch pressure plates with greater holding power, while at the same time requiring lighter than OEM pedal effort.

The adapter rings may be made of any suitable material, such as steel, aluminum, titanium or any other material having sufficient strength. The adapter rings may be fabricated by any suitable technique, such as machining to provide the flat base surface and holes for existing flywheel and clutch patterns, and the raised portion for pressure plate and floater plate attachment.

The adapter rings of the present invention allow the use of existing OEM or other aftermarket flywheels. There is no need to purchase another flywheel when purchasing a new OEM replacement clutch assembly. The adapter rings also allow the use of existing throw-out bearing assemblies, as well as the use of pressure plate assemblies that keep the clutch pedal effort lighter than most OEM applications. Furthermore, the adapter rings may keep the pedal effort and release height the same as in OEM assemblies, and allow the use of multiple discs on OEM or other aftermarket flywheels. The adapter rings match the OEM clutch patterns and dowel pins, and increase the holding power beyond OEM type and other aftermarket clutches. Higher-horsepower engines and drivelines may thus be more readily used within current and future automotive vehicles.

Whereas particular embodiments of this invention have been described above for purposes of illustration, it will be evident to those skilled in the art that numerous variations of the details of the present invention may be made without departing from the invention as defined in the appended claims.

The invention claimed is:

1. An adapter ring for attaching automotive clutch assemblies to flywheels comprising:
   an annular base comprising a planar flywheel-engaging surface extending continuously around a circumference of the adapter ring, a planar opposing surface extending continuously around the circumference of the adapter ring defining a thickness B of the base measured between the flywheel-engaging surface and the opposing surface, a radial outermost edge extending continuously around the circumference of the adapter ring defining an outer diameter of the annular base, and a central hole extending axially through the annular base and having a cylindrical surface extending continuously around the circumference of the adapter ring defining an inner diameter of the annular base;

at least two arcuate raised portions circumferentially and discontinuously spaced from each other around the circumference of the adapter ring structured for attachment to the clutch assembly extending axially a height H from the opposing surface of the base comprising a radial outermost surface defining an outer diameter of the raised portion less than the outer diameter of the annular base, and a radial innermost surface defining an inner diameter of the raised portion substantially the same as the inner diameter of the annular base, wherein the adapter ring has an overall thickness T equal to the sum of the thickness B of the base and the height H of each of the at least two arcuate raised portions, and the overall thickness T of the adapter ring is sufficiently large to allow multiple clutch discs to be installed in the clutch assembly;

a first set of flywheel mounting holes extending axially through the base radially outside of the outer diameter of each of the at least two arcuate raised portions arranged for mounting the adapter ring to a first type of flywheel; and a second set of flywheel mounting holes at different locations from the first set of flywheel mounting holes extending axially through the base radially outside of the outer diameter of each of the at least two arcuate raised portions arranged for mounting the adapter ring to a second type of flywheel.

2. The adapter ring of claim 1, wherein the first set of flywheel mounting holes comprises six holes equally spaced around the circumference of the base, and the second set of flywheel mounting holes comprises six holes equally spaced around the circumference of the annular base.

3. The adapter ring of claim 2, wherein the first and second sets of flywheel mounting holes are located at different radial distances from an axial center of the adapter ring.

4. The adapter ring of claim 2, wherein the first and second sets of flywheel mounting holes have the same diameters.

5. The adapter ring of claim 2, wherein the first and second sets of flywheel mounting holes have different diameters.

6. The adapter ring of claim 1, further comprising a third set of flywheel mounting holes at different locations from the first and second sets of flywheel mounting holes extending axially through the base radially outside of the outer diameter of the at least two arcuate raised portions arranged for mounting the adapter ring to a third type of flywheel.

7. The adapter ring of claim 6, wherein the third set of flywheel mounting holes comprises three pairs of holes, with each pair of holes equally spaced around the circumference of the base from the other pairs of holes.

8. The adapter ring of claim 6, wherein the third set of flywheel mounting holes have smaller diameters than diameters of the first and second sets of flywheel mounting holes.

9. The adapter ring of claim 6, further comprising a fourth set of flywheel mounting holes at different locations from the first, second and third sets of flywheel mounting holes extending axially through the base radially outside of the outer diameter of the at least two arcuate raised portions and arranged for mounting the adapter ring to a fourth type of flywheel.

10. The adapter ring of claim 9, wherein the fourth set of flywheel mounting holes comprise three pairs of holes, with each pair of holes equally spaced around the circumference of the base from the other pairs of holes.

11. The adapter ring of claim 10, wherein the fourth set of flywheel mounting holes have smaller diameters than diameters of the first and second sets of flywheel mounting holes.

12. The adapter ring of claim 9, wherein the third and fourth sets of flywheel mounting holes are located at different radial distances from an axial center of the adapter ring.

13. The adapter ring of claim 1, further comprising a first set of dowel pin holes at different locations from the first and second sets of flywheel mounting holes extending axially through the base.

14. The adapter ring of claim 13, wherein the first set of dowel pin holes comprises three holes equally spaced around the circumference of the base and located at the same radial distance from an axial center of the adapter ring as the first set of flywheel mounting holes.

15. The adapter ring of claim 13, further comprising a second set of dowel pin holes at different locations from the first set of dowel pin holes and the first and second sets of flywheel mounting holes.

16. The adapter ring of claim 15, wherein the second set of dowel pin holes comprises two holes equally spaced around the circumference of the base and located at a different radial distance from the axial center of the adapter ring than the first set of dowel pin holes and the first and second sets of flywheel mounting holes.

17. The adapter ring of claim 1, further comprising a set of three recesses at different locations from the first and second sets of flywheel mounting holes extending axially partially through the base.

18. The adapter ring of claim 17, wherein the three recesses are equally spaced around the circumference of the base.

19. The adapter ring of claim 1, comprising at least three of the raised portions.

20. The adapter ring of claim 19, wherein each of the raised portions comprises at least one pressure plate mounting hole extending axially through the raised portion.

21. The adapter ring of claim 20, wherein each of the raised portions are equally spaced around the circumference of the base and comprises two of the pressure plate mounting holes.

22. The adapter ring of claim 21, wherein the pressure plate mounting holes are tapped and extend axially through the base.

23. The adapter ring of claim 19, wherein each of the raised portions comprises a floater strap mounting hole extending axially through the raised portion.

24. The adapter ring of claim 23, wherein the floater strap mounting holes are equally spaced around the circumference of the base, are tapped, and extend axially through the base.

25. The adapter ring of claim 19, wherein each of the raised portions comprises at least one recessed spot face extending axially along the height of the raised portion arranged to provide a clearance space for an adjacent one of the flywheel mounting holes.

26. An assembly comprising:
an automotive clutch assembly comprising multiple clutch discs;
an automotive flywheel; and
an adapter ring connecting the automotive clutch assembly to the automotive flywheel, wherein the adapter ring comprises:

an annular base comprising a planar flywheel-engaging surface extending continuously around a circumference of the adapter ring, a planar opposing surface extending continuously around the circumference of the adapter ring defining a thickness B of the base measured between the flywheel-engaging surface and the opposing surface, a radial outermost edge extending continuously around the circumference of the adapter ring defining an outer diameter of the annular base, and a central hole extending axially through the annular base and having a cylindrical surface extending continuously around the circumference of the adapter ring defining an inner diameter of the annular base;

at least two arcuate raised portions circumferentially and discontinuously spaced from each other around the circumference of the adapter ring structured for attachment to the clutch assembly extending axially a height H from the opposing surface of the base comprising a radial outermost surface defining an outer diameter of the raised portion less than the outer diameter of the annular base, and a radial innermost surface defining an inner diameter of the raised portion substantially the same as the inner diameter of the annular base, wherein the adapter ring has an overall thickness T equal to the sum of the thickness B of the base and the height H of each of the at least two arcuate raised portions, and the overall thickness T of the adapter ring is sufficiently large to allow the clutch discs to be installed in the clutch assembly;

a first set of flywheel mounting holes extending axially through the base radially outside of the outer diameter of each of the at least two arcuate raised portions arranged for mounting the adapter ring to a first type of flywheel; and a second set of flywheel mounting holes at different locations from the first set of flywheel mounting holes extending axially through the base radially outside of the outer diameter of each of the at least one arcuate raised portion arranged for mounting the adapter ring to a second type of flywheel.

27. The assembly of claim 26, wherein the automotive clutch assembly is mounted on at least one arcuate raised portion.

28. The assembly of claim 27, comprising three of the arcuate raised portions equally spaced around the circumference of the base, and each of the three arcuate raised portions comprises two pressure plate mounting holes and one floater strap mounting hole extending axially therethrough.

29. The assembly of claim 26, wherein the automotive clutch assembly is an aftermarket multiple-disc clutch assembly.

30. A method of installing an automotive clutch assembly on an automotive flywheel comprising:
  selecting an adapter ring from a plurality of adapter rings having different flywheel mounting hole arrangements;
  attaching the automotive clutch assembly comprising multiple clutch discs to the adapter ring; and
  attaching the adapter ring to the automotive flywheel, wherein the adapter ring comprises:
    an annular base comprising a planar flywheel-engaging surface extending continuously around a circumference of the adapter ring, a planar opposing surface extending continuously around the circumference of the adapter ring defining a thickness B of the base measured between the flywheel-engaging surface and the opposing surface, a radial outermost edge extending continuously around the circumference of the adapter ring defining an outer diameter of the annular base, and a central hole extending axially through the annular base and having a cylindrical surface extending continuously around the circumference of the adapter ring defining an inner diameter of the annular base;
    at least two arcuate raised portions circumferentially and discontinuously spaced from each other around the circumference of the adapter ring structured for attachment to the clutch assembly extending axially a height H from the opposing structure of the base comprising a radial outermost surface defining an outer diameter of the raised portion less than the outer diameter of the annular base, and a radial innermost surface defining an inner diameter of the raised portion substantially the same as the inner diameter of the annular base, wherein the adapter ring has an overall thickness T equal to the sum of the thickness B of the base and the height H of each of the at least two arcuate raised portions, and the overall thickness T of the adapter ring is sufficiently large to allow the clutch discs to be installed in the clutch assembly;
    a first set of flywheel mounting holes extending axially through the base radially outside of the outer diameter of each of the at least two arcuate raised portions arranged for mounting the adapter ring to a first type of flywheel; and
    a second set of flywheel mounting holes at different locations from the first set of flywheel mounting holes extending axially through the base radially outside of the outer diameter of each of the at least one arcuate raised portion arranged for mounting the adapter ring to a second type of flywheel.

31. The method of claim 30, wherein the automotive clutch assembly is attached to the adapter ring before the adapter ring is attached to the automotive flywheel.

\* \* \* \* \*